United States Patent
Pujare et al.

(10) Patent No.: US 7,330,967 B1
(45) Date of Patent: Feb. 12, 2008

(54) SYSTEM AND METHOD FOR INJECTING DRIVERS AND SETUP INFORMATION INTO PRE-CREATED IMAGES FOR IMAGE-BASED PROVISIONING

(75) Inventors: Sanjay Madhav Pujare, San Jose, CA (US); Benjamin Fang-Ping Shang, Fremont, CA (US); Saravanan Bellan, Mountain View, CA (US)

(73) Assignee: Symantec Operating Corporation, Cupertino, CA (US)

( * ) Notice: Subject to any disclaimer, the term of this patent is extended or adjusted under 35 U.S.C. 154(b) by 50 days.

(21) Appl. No.: 11/003,284

(22) Filed: Dec. 3, 2004

(51) Int. Cl.
*G06F 15/177* (2006.01)
*G06F 9/00* (2006.01)
*G06F 9/44* (2006.01)

(52) U.S. Cl. .................. 713/2; 713/100; 717/170
(58) Field of Classification Search ............. 713/2, 713/1, 100; 717/172, 175, 178, 170; 709/220
See application file for complete search history.

(56) References Cited

U.S. PATENT DOCUMENTS

| | | | | |
|---|---|---|---|---|
| 6,080,207 A | * | 6/2000 | Kroening et al. | 717/172 |
| 6,247,128 B1 | * | 6/2001 | Fisher et al. | 713/100 |
| 6,804,774 B1 | * | 10/2004 | Larvoire et al. | 713/2 |
| 6,889,157 B2 | * | 5/2005 | Mutchler et al. | 702/119 |
| 6,928,644 B1 | * | 8/2005 | Kroening et al. | 717/175 |
| 7,076,536 B2 | * | 7/2006 | Chiloyan et al. | 709/220 |
| 2003/0088428 A1 | | 5/2003 | Singhal | |
| 2003/0126202 A1 | | 7/2003 | Watt | |
| 2003/0163809 A1 | * | 8/2003 | Bantz et al. | 717/177 |
| 2005/0149924 A1 | | 7/2005 | Komarla et al. | |
| 2005/0216912 A1 | * | 9/2005 | Cox et al. | 717/178 |

FOREIGN PATENT DOCUMENTS

| JP | 11296375 A | * | 10/1999 |
|---|---|---|---|
| JP | 2003288216 A | * | 10/2003 |

OTHER PUBLICATIONS

"Automating Windows 2000 Deployments with Sysprep," Microsoft Corporation, pp. 1-40, May 2000.
"Microsoft Windows and the Plug and Play Framework Architecture", pp. 1-11, Mar. 1994.
"Automated Server Provisioning Benefits and Practices," Altiris, Inc., pp. 1-11, Aug. 31, 2004.
"Microsoft's New SysPrep Tool," Mark Joseph Edwards, pp. 1-5, Apr. 1999.

* cited by examiner

*Primary Examiner*—Suresh K Suryawanshi
(74) *Attorney, Agent, or Firm*—Meyertons Hood Kivlin Kowert & Goetzel, P.C.; B. Noël Kivlin (57) ABSTRACT

A system for injecting drivers and setup information into pre-created images for image-based provisioning includes a disk image, a software driver configured to allow access to a specific hardware device (such as a disk or a network interface card), and a provisioning tool. The provisioning tool may be configured to insert the software driver and customized system setup information (e.g., a host name and network information) into the disk image after the creation of the disk image and prior to a boot from the disk image of an uninstalled host including the specific hardware device.

26 Claims, 10 Drawing Sheets

SYSTEM AND METHOD FOR INJECTING DRIVERS AND SETUP INFORMATION INTO PRE-CREATED IMAGES FOR IMAGE-BASED PROVISIONING

BACKGROUND OF THE INVENTION

1. Field of the Invention

This invention relates to computer systems and, more particularly, to image-based provisioning of computer systems.

2. Description of the Related Art

Many business organizations and governmental entities rely upon large data centers, including hundreds or thousands of individual computer hosts or servers to provide support for complex mission-critical applications. The collection of computer hosts within a data center may be heterogeneous in nature, including many different types of hosts from many different manufacturers, supporting different operating systems and a variety of hardware devices such as disks, network cards, and the like from different hardware vendors. In addition to the application servers at the data centers, an information technology (IT) department may also need to support a large number of workstations (such as desktop and/or laptop computer systems) and supporting servers (such as email servers, web servers) for use by the employees of the organization.

As the computing needs of an organization grow, more and more processing power may need to be deployed. The process of allocating additional resources such as new computer hosts, additional storage, additional networking bandwidth etc. in response to growing needs within an organization may be termed "provisioning". Configuring individual new hosts manually would be increasingly difficult, expensive and error-prone as the environment scaled in size and complexity. Therefore, in some IT organizations, specialized provisioning tools may be used to ensure a desired degree of consistency when configuring newly allocated hosts.

A provisioning tool may, for example, allow an administrator to install a desired version of an operating system and a desired set of application software on a source computer host, and to create a disk image (i.e., a copy) of the system disk of the source computer host for use in installing newly provisioned hosts. The disk image may then be written to a system disk at each newly provisioned host, so that all newly provisioned hosts are deployed with a common operating system version and common application software. Such a provisioning technique of using a disk image to install software at a host, instead of installing a newly provisioned host manually from installation CDs or other removable media, may be termed image-based provisioning. Image-based provisioning may provide several advantages over more traditional provisioning or installation techniques, including a reduction in total installation time, better support for automation and a corresponding reduction in the probability of human errors. In many cases a standard set of disk images for image-based provisioning may be created, e.g., a set including one disk image corresponding to each operating system in use within a data center, and employed repeatedly as new hosts are provisioned.

In some cases, the disk images created for use in image-based provisioning may not include all the software (e.g., device drivers) needed to operate some of the hardware devices included within a newly provisioned or as-yet uninstalled host. For example, a newly acquired host may have been equipped by its manufacturer with a faster and/or cheaper disk or network interface card than was included within the source host from which a disk image for image-based provisioning was created. A device driver for the new hardware device may not have been available when the disk image was created. A particular hardware device for which an additional software driver (i.e., a driver not included within the original disk image) is needed may sometimes be utilized during a bootstrap or boot process at the host: that is, the host may not even be bootable without the additional driver in such cases. It may therefore be desirable to implement a technique that allows additional software to be inserted into a previously created disk image, prior to a boot and/or installation of the newly provisioned host using the disk image. In addition, it may also be desirable to automate the insertion of system setup information (e.g., a host name, a time zone identification etc.) into the previously created disk image, allowing the newly provisioned host to be customized and made operational with minimal manual intervention.

SUMMARY OF THE INVENTION

Various embodiments of a system and method for injecting drivers and setup information into pre-created images for image-based provisioning are disclosed. According to a first embodiment, a system may include a disk image, a software driver configured to allow access to a specific hardware device such as a disk or a network interface card, and a provisioning tool. The provisioning tool may be configured to insert the software driver into the disk image after the creation of the disk image and prior to a boot from the disk image of an uninstalled host including the specific hardware device. The disk image may have been created by copying the contents of a system disk at a master host, and may include one or more applications as well as an operating system intended for use at the uninstalled host.

In one embodiment, the provisioning tool may also be configured to insert system setup information into the disk image prior to the boot of the uninstalled host. The system setup information may include various elements that may be used to customize the uninstalled host, such as a host name, a network address and domain name, a list of users and/or groups, a company name, regional settings, time zone identification, license information, etc. In addition to inserting the software driver and the system setup information, the provisioning tool may also be configured to modify one or more configuration settings or parameter files within the disk image, allowing an operating system in the disk image to locate the inserted driver and setup information during boot.

In a second embodiment, the provisioning tool may be configured to load the disk image to a disk at the uninstalled host prior to inserting the software driver and the system setup information. In another embodiment, the disk image may initially be stored within an image repository, and the provisioning tool may be configured to insert the software driver into the disk image within the repository, i.e., prior to loading the disk image to the uninstalled host.

In one specific embodiment, the provisioning tool may be configured to obtain a device identifier (such as a Plug and Play Identifier or PnP ID) from the hardware device at the uninstalled host, and to query a driver database using the device identifier to identify the software driver needed to operate the hardware device. In such an embodiment, the provisioning tool may then obtain the software driver from a software driver repository, and insert it into the disk image. In another embodiment, the provisioning tool may provide a listing of the initial contents of the disk image to a user, and the user may supply the software driver to the provisioning tool after making a determination that the software driver is not present in the disk image.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
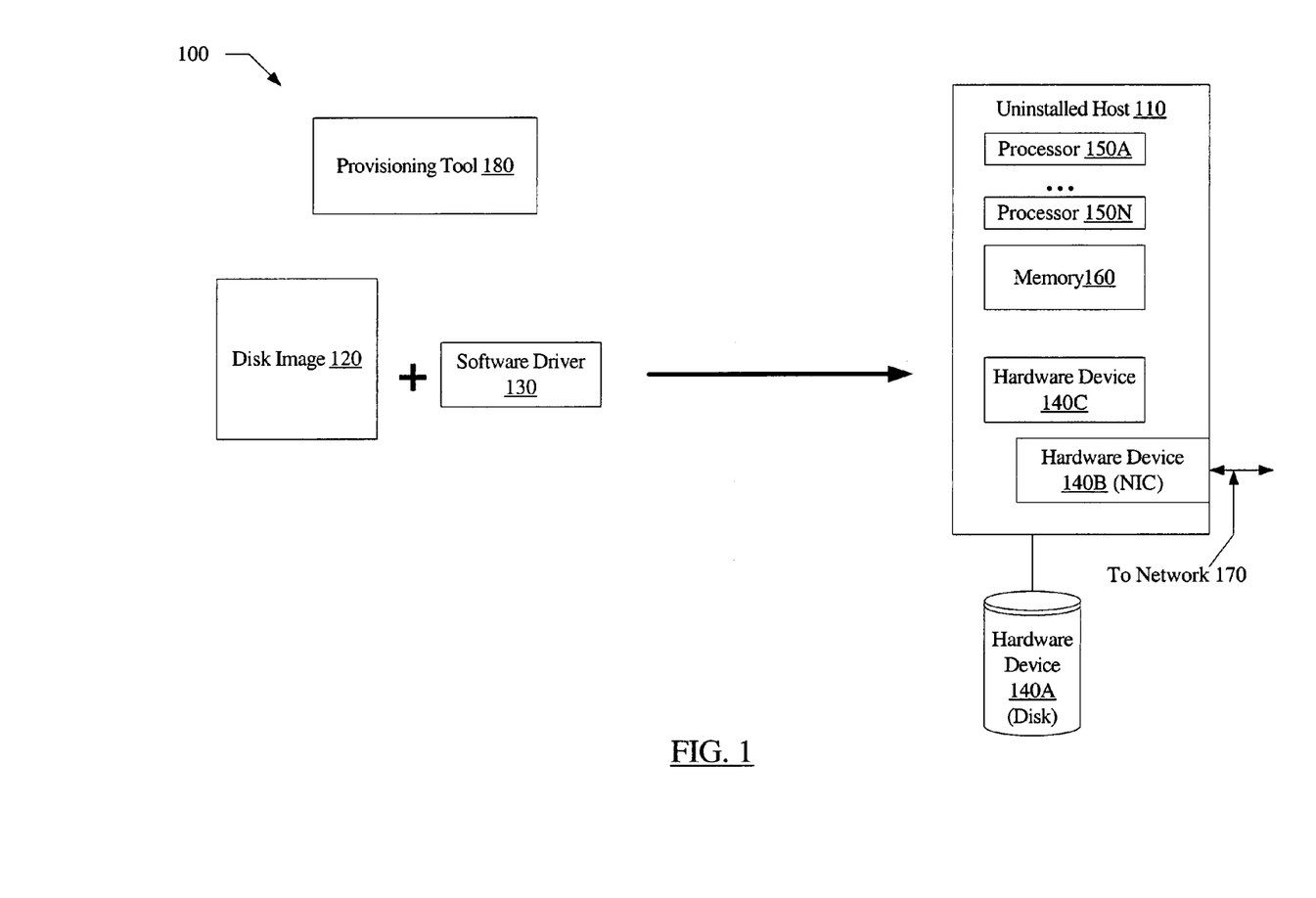
FIG. 1 is a block diagram illustrating one embodiment of a system.

FIG. 1 is a block diagram illustrating a system 100 according to one embodiment. As shown, system 100 includes a provisioning tool 180, a disk image 120, and a software driver 130. The software driver 130 may be configured to allow access to a specific hardware device, such as any of one or more hardware devices 140A-140C included within an uninstalled host 110. The term "uninstalled host", as used herein, refers to a host computer system that does not have a desired operating system, or a desired version of an operating system, installed on it. Uninstalled host 110 may comprise one or more processors such as processors 150A-150N, one or more memories such as memory 160, and the hardware devices 140A-140C. Hardware devices 140A-C (which may be collectively referred to herein as hardware devices 140) may include numerous types of devices in different embodiments, such as disks (e.g., hardware device 140A), network interface cards (NICs) (e.g., hardware device 140B) allowing access from host 110 to a network 170, video cards, sound cards, peripheral devices such as a mouse or a keyboard, additional storage devices such as CD-ROM drives, CD-RW drives, DVD-ROM drives, DVD-RW drives, interface cards for storage devices, etc. Software driver 130 may not have been included within disk image 120 at the time disk image 120 was created, for any of a variety of reasons described below in further detail. Provisioning tool 180 may be configured to insert software driver 130 into disk image 120 after the creation of disk image 120, and prior to booting uninstalled host 110 off disk image 120.

Many organizations today deploy a large number of computer systems or hosts distributed among a variety of locations within the organization, such as one or more data centers supporting enterprise applications (e.g., online transaction processing systems, database management systems, web services etc.), as well as employee offices or workstations. The task of managing the growth of the information technology (IT) infrastructure in such large organizations has become more complex over time, especially as relatively rapid changes occur in the hardware (e.g., changes in processor speeds, network bandwidth, and storage capacity) as well as software (e.g., operating system versions and applications) that may need to be supported. In many environments, efficient provisioning, i.e., the efficient acquisition, allocation, configuration and deployment of new computer systems in response to demand growth, has become a critical requirement for IT organizations. Not only are IT organizations required to plan ahead and quickly respond to the changing needs of the enterprise (e.g., by maintaining pools of computer systems that can be allocated to different tasks as needed), but they are also often tasked with reducing ongoing support costs. One common approach to reducing support costs is to install consistent software configurations (e.g., a common operating system and a standard set of productivity software applications for office use) across newly deployed computer systems, and to employ as much automation as possible in doing so. At the same time, IT organizations also have to deal with common industry trends, such as the rapid evolution (and accompanying rapid obsolescence) of traditional hardware devices such as disks and network interfaces, and the increase in the different kinds of new peripheral devices that may be used with modern computer systems.

A variety of different approaches to the problem of maintaining consistent software configurations across newly deployed computer hosts have been tried. Manual installation, i.e., installation of an operating system and a set of desired applications using a process that involves manual intervention (e.g., insertion of one or more installation CDs, or a selection of one or more operations from a menu) may be expensive and/or error prone for many large computing environments. In contrast, installation using disk images (such as disk image 120 of FIG. 1), also known as image-based provisioning, has emerged as a more scalable solution and is increasing in popularity.

The process of image-based provisioning may typically begin with a selection (e.g., by an IT administrator) of a desired software configuration that is to be consistently deployed across the new, uninstalled computer systems or hosts. The desired software configuration may include a specific version of an operating system and one or more applications. The operating system as well as the applications may be selected based on the set of tasks for which the new hosts are being brought into service. For example, in an environment where the new hosts are to be used by software engineers for software development as well as for standard office tasks such as e-mail, a version of Microsoft Windows™ may be selected as the operating system, and the applications installed may include one or more e-mail clients, productivity software such as spreadsheets and word processors, and a software development environment (SDE) selected according to a corporate or departmental policy. When the new hosts are to be deployed to support an enterprise application such as online transaction processing (OLTP), the application software installed may include database server software and application server software, and the operating system may be any desired server operating system, such as a version of Solaris™ from Sun Microsystems, a server version of Microsoft Windows™, a version of IBM's AIX™ operating system, or a version of the Linux operating system.

The desired software configuration may then be installed (e.g., using a standard installation technique such as manual installation from one or more installation CDs) on a particular host selected as a "master" or "source" host, from which a disk image may be obtained in a later step. The desired operating system and desired application software may be installed on the master host in this step. For some operating systems, one or more tasks typically performed during installation may be modified or left out during the installation of the master, in order to simplify later steps of image-based provisioning. For example, in a Microsoft Windows™ environment, a step of identifying a network domain for the master host may be omitted, and the system administrator password may be left blank. One or more default user profiles may also be set up on the master host at this stage. At the end of the installation, a system administrator or a tool such as an automated script may validate that all the desired software components are present on the master system.

After a successful validation, in some environments such as Windows™, the master host may need to be "prepared" for a creation of a disk image, for example using a special system preparation utility (e.g., Microsoft's "Sysprep" utility). The system preparation utility may perform a number of operations, such as a modification of a configuration setting or parameter to ensure that a system setup tool (e.g., Microsoft's "Mini-Setup Wizard") is invoked the next time the master (or another host installed using a disk image from the master) is booted. The system setup tool, may, for example, allow a specification of such host-specific information as a host name, an administrator password, an identification of a time zone, etc., when invoked during the boot process. In some cases, e.g., based on an expected hardware configuration of a target system that is to be installed using a disk image from the master, the system preparation tool may also allow an administrator to add specific software drivers (e.g., in a particular directory or folder designated to hold software drivers) prior to the creation of the disk image.

The next step in image-based provisioning may be the creation of the disk image itself. That is, the contents of a system disk (i.e., a disk on which the operating system and applications were previously installed on the master host) may be copied or saved, e.g., on a storage device external to the master host. Finally, the disk image may be copied to each uninstalled host where the desired software configuration is to be installed. Once the disk image is loaded (e.g., on a target system disk) at the uninstalled host, the host may be booted. In cases where the system setup tool was configured to be invoked upon the next reboot (as described above), the host-specific information may be provided (either manually or via a script or configuration file) to the system setup tool during system initialization, and the previously uninstalled host may be brought up to provide normal operation.

Due to any of a number of reasons, however, a disk image 120 may not include one or more software drivers (e.g., software driver 130 of FIG. 1) required to operate one or more hardware devices 140 on a targeted uninstalled host 110. For example, in one embodiment, the uninstalled host 110 may include a new disk device or a network interface card that may not have been in use at the master host from which disk image 120 was prepared. The new hardware device may not have existed at the time the disk image was created, or its existence in the target host 110 may not have been anticipated. A software driver 130 for a particular hardware device 140 may not have been developed, or may not have been available for sale, at the time that the disk image 120 was created. In some embodiments, a new version of a software driver may be required for the hardware device 140, for example due to an upgrade to the firmware associated with the hardware device. A needed software driver 130 may also have been inadvertently left out of the master hosts' system disk prior to a creation of the disk image 120, despite the best efforts of the administrator responsible for validating that the desired software configuration was correctly installed on the master host. In some embodiments, where for example the hardware device 140 with the missing software driver is a disk, the target host 110 may not even be capable of booting the desired operating system off the disk image 120 in the absence of the needed software driver 130. In other embodiments, one or more crucial steps during the initial bring-up of a host may require network communication (e.g., with a domain configuration server, a router or another network configuration device) using a network interface card such as 140B, and the missing software driver 130 may be required to operate the network interface card.

Figure 2:
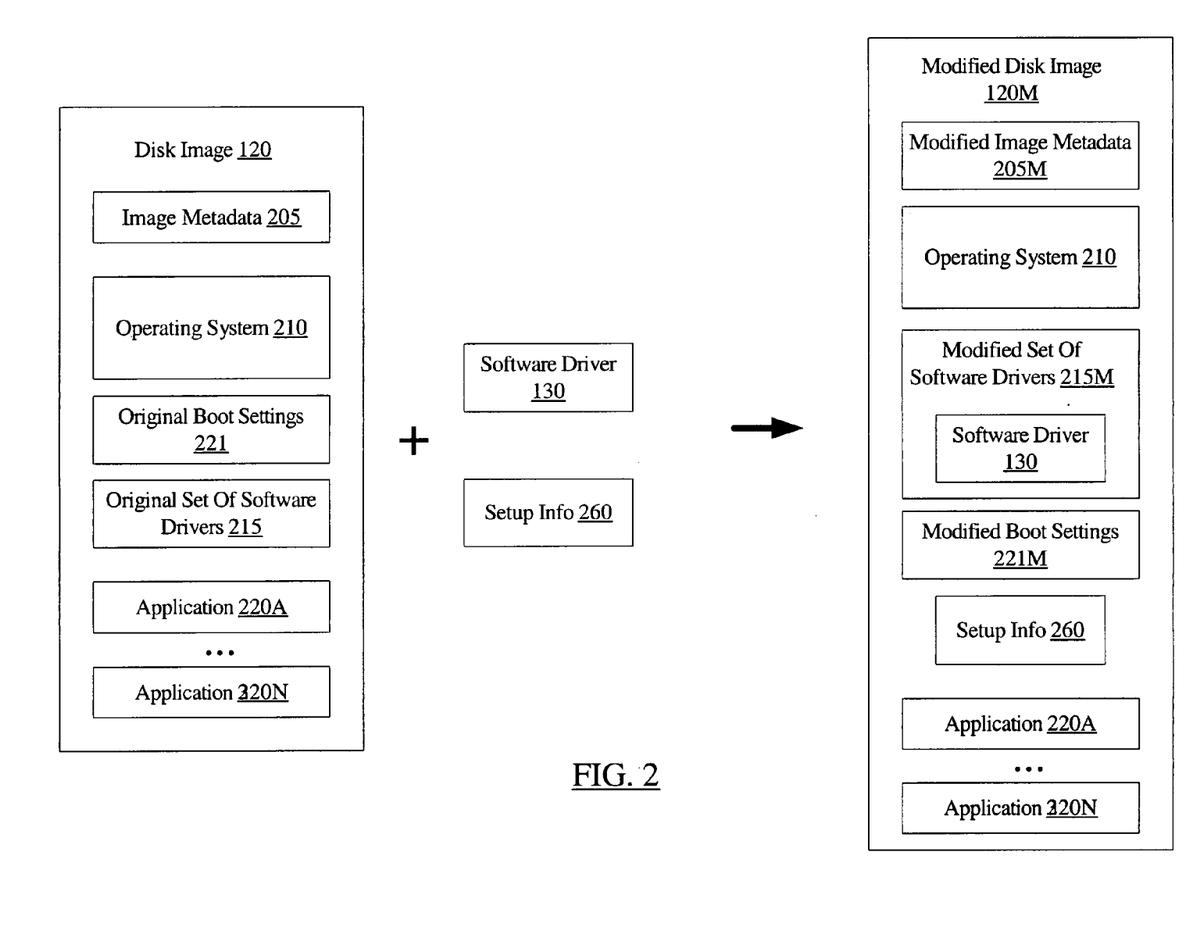
FIG. 2 is a block diagram illustrating exemplary contents of a disk image before and after an insertion of software and system setup information by a provisioning tool, according to one embodiment.

A provisioning tool 180 may be configured to modify the existing disk image in such situations, i.e., to insert the needed software driver 130 into disk image 120 prior to the time the disk image is used to boot the uninstalled host 110. Provisioning tool 180 may also be configured to add system setup information, including such host-specific details as a host name, to an existing disk image 120 prior to the boot, in order to avoid or reduce the amount of manual intervention typically needed during an initial bring-up (i.e., a first boot) of a new host. FIG. 2 is a block diagram illustrating exemplary contents of disk image 120 before and after an insertion of software and system setup information by provisioning tool 180, according to one embodiment.

Initially, disk image 120 may include a number of constituent components, such as image metadata 205, an operating system 210, an original set of software drivers 215, original boot settings 221, and one or more applications 220A-220N (which may be collectively referred to herein as applications 220). The image metadata 205 may include details of the format of disk image 120, e.g., the offsets at which the remaining constituents are laid out within the disk image 120, and information about compression techniques which may have been used during the creation of the disk image 120. The operating system 210, the original set of software drivers 215, and the applications 220, may match the desired software configuration selected according to the intended functionality of the target host 114, as described earlier. Original boot settings 221, which may include one or more boot-related configuration files and/or system registry settings, may specify details of various aspects of the boot operation to be performed next: e.g., the number of processors to be brought up, the location of software drivers within the disk image 120, etc. As described below in further detail, in some embodiments provisioning tool 180 may also be used to create a disk image 120, e.g., by performing a snapshot operation on a master host's system disk. That is, the same provisioning tool 180 may be used to create the initial disk image 120, and to later modify it as needed.

Figure 3:
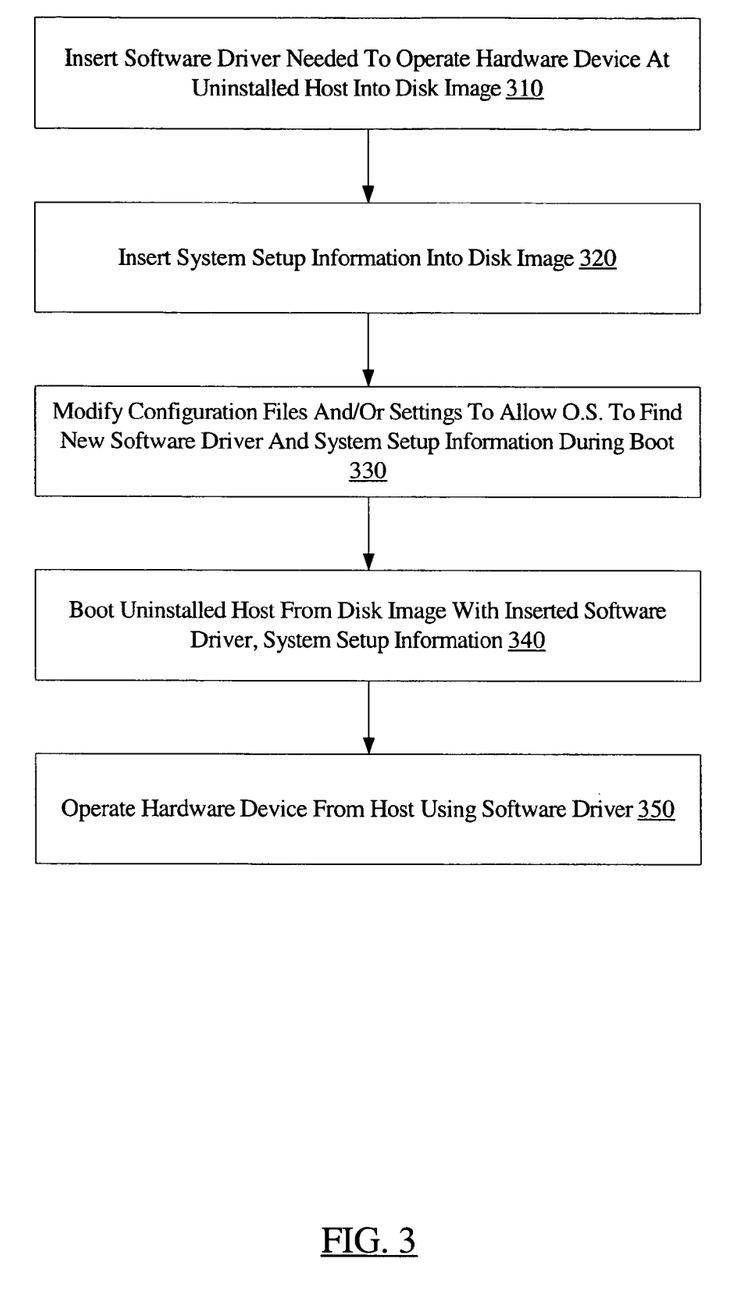
FIG. 3 is a flow diagram illustrating aspects of the operation of a provisioning tool and a host according to one embodiment.

FIG. 3 is a flow diagram illustrating aspects of the operation of provisioning tool 180 and host 110, according to one embodiment, where a needed software driver 130 is not present in an original disk image 120. Further details on how the absence of a software driver may be detected in different embodiments, and where the disk image may be physically located when it is modified by provisioning tool 180, are provided below. As shown in block 310 of FIG. 3, provisioning tool 180 may be configured to insert the needed software driver 130 into the original disk image 120. Multiple software drivers 130 may be inserted in some embodiments, based on the number of hardware devices 140 for which corresponding software drivers are not present in original disk image 120. In addition to inserting the software driver or drivers 130, provisioning tool 180 may also be configured to insert system setup information 260 for the uninstalled host (block 320 of FIG. 3). System setup information may include any combination of the following pieces of information in different embodiments, as well as additional setup information not explicitly listed herein: a host name, a unique host identifier (e.g., an identifier similar to a Microsoft Windows™ SID or System Identifier, which may be used to reduce the likelihood of unauthorized copying of operating system installations), an operating system product code, a license code, regional settings (which may be used to select a language for interacting with a user), an Internet Protocol (IP) address, a network domain name, a time zone identification, an administrator password, a user name or a set of user names with associated properties such as passwords and capabilities, a group name or a set of group names with associated properties such as passwords and capabilities, a company name, and a list of optional software modules to be installed. Software driver 130 and the system setup information 260 may be inserted into disk image 120 in any order; e.g., the system setup information 260 may be inserted prior to the insertion of the software driver 130 in one embodiment, and the two may be inserted in parallel (e.g., utilizing multiple threads or processes) in another embodiment.

In some embodiments, the software driver 130 and the system setup information 260 may each may be inserted at a respective designated location within disk image 120, e.g., in an operating system-specific special folder, directory or file, or at a special offset within disk image 120. In one embodiment, provisioning tool 180 may be configured to modify configuration files or settings (e.g., to modify initial boot settings 221) to allow the operating system 210 to locate the inserted software driver or drivers 130 and the system setup information 260 (block 330 of FIG. 3). That is, in addition to containing a modified set of software drivers 215M including the added software driver 130, and the added system setup information 260, modified disk image 120M may also include modified boot settings 221M, as shown in FIG. 2. In one embodiment, the image metadata 205 may also have been modified, forming modified image metadata 205M, for example to indicate the specific nature of the modifications made to the original disk image 120, or to provide compression-related configuration information on the newly added software driver or drivers. It is noted that in embodiments where the insertion of the software driver occurs after the original disk image is loaded at the uninstalled host 110, image metadata 205 (or its modified version, 205M) may not be stored within the loaded disk image, i.e., image metadata may be omitted from the target host 110. Modified configuration information, such as modified boot settings 221M, may be used by operating system 210 during a subsequent boot of host 110, such as the boot operation illustrated in block 340 of FIG. 3. In some embodiments, where for example added software drivers 130 and/or system setup information 260 are located in well-known or standard locations within modified disk image 120M, the operations corresponding to block 330 may also be omitted.

After the uninstalled host 114 is booted using the modified disk image 120M, the host may begin to provide normal operation, including accessing the hardware device 140 for which the software driver 130 was inserted (block 350). The system setup information 260 may be used during the initial boot off the modified disk image to customize various aspects of the operation of host 110, for example, to provide the host 110 with a host name and an IP address for network communication. In some embodiments, host 110 may be configured to participate in additional configuration operations after the initial boot with modified disk image 120M, such as an automated installation of additional optional software packages or components over a network, before the host 110 become fully operable to provide the desired functionality. In one embodiment, the specification of system setup information may not be fully automated: that is, while provisioning tool 180 may be configured to insert additional drivers 130 into disk image 120, part or all of the system setup information 260 may still be obtained interactively, e.g., from a system administrator during the initial boot of host 110.

Figure 4:
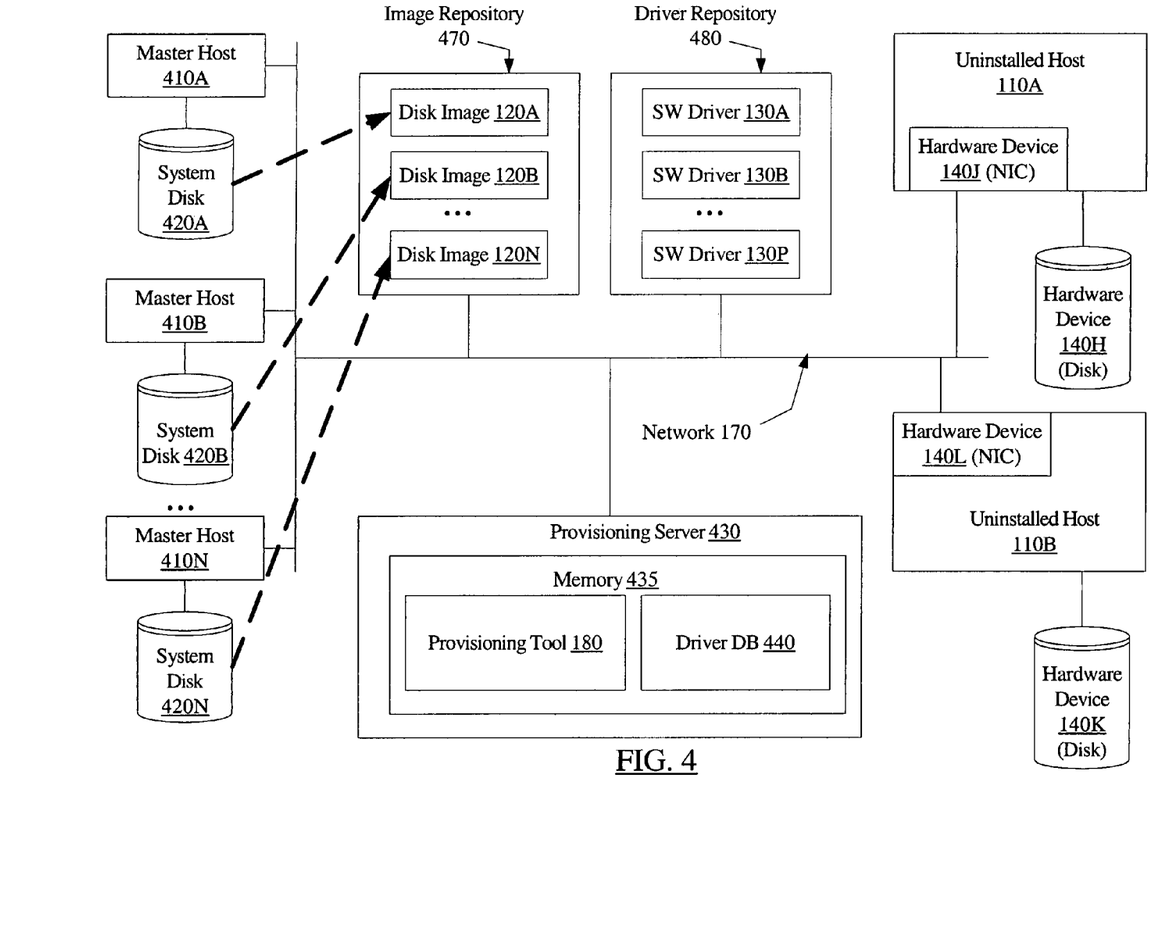
FIG. 4 is a block diagram illustrating an embodiment where a plurality of disk images may be stored within an image repository.

FIG. 4 is a block diagram illustrating an embodiment where a plurality of disk images 120A-120N (collectively, disk images 120) may be stored within an image repository 470. As indicated by the dashed arrows in FIG. 4, disk images 120 corresponding to a number of system disks 420A-420N at respective master hosts 410A-410N may be stored within the image repository 470. For example, in one embodiment, provisioning tool 180 may be used to perform a snapshot operation on each system disk 420 (i.e., to create a point-in-time copy of the system disk) to form a corresponding disk image 120, and to store the disk image in image repository 470. The disk images may be created using a tool other than provisioning tool 180, such as a disk copy tool, in other embodiments. The master hosts 410 may differ from each other in various characteristics: for example, in one embodiment the operating system used at a particular master host 410A may differ from the operating system used at another master host 410B. In other embodiments, master hosts 410 may differ from one another in their respective hardware configurations, or in the set of installed applications. For each master host 410, a corresponding disk image 120 may be created, thereby establishing a suite of disk images with different characteristics, from which a desired disk image may be selected for use within a given uninstalled host. For example, disk image 120A may be a Microsoft Windows™ image suitable for an office workstation, disk image 120B may be a Linux image suitable for a web server, and disk image 120N may be a Sun SolariS™ image suitable for a database server or a database cluster node.

As shown in FIG. 4, in the depicted embodiment, system 100 may include a provisioning server 430, uninstalled hosts 110 (e.g., 110A and 110B), and a software driver repository 480 in addition to master hosts 410 and image repository 470. Provisioning server 430 may be a host including one or more processors (not shown), a memory 435 in which provisioning tool 180 and a driver database 440 may be resident, as well as other hardware and software components (not shown). That is, in the illustrated embodiment, provisioning tool 180 may comprise one or more executable software modules. Provisioning server 430 may be coupled to master hosts 410, image repository 470, software driver repository 480 and uninstalled hosts 110A and 110B by network 170. Image repository 470 may include one or more storage devices, such as individual disks or disk array devices that may provide storage capacity for disk images 210. In one embodiment, image repository 470 may be implemented using removable storage, such as a set of DVD-RW or CD-RW devices. In some embodiments, the disk images 120 may be stored in compressed formats to conserve storage space. Further details on the functionality provided by driver database 440 and software driver repository 480 are provided below.

Figure 5:
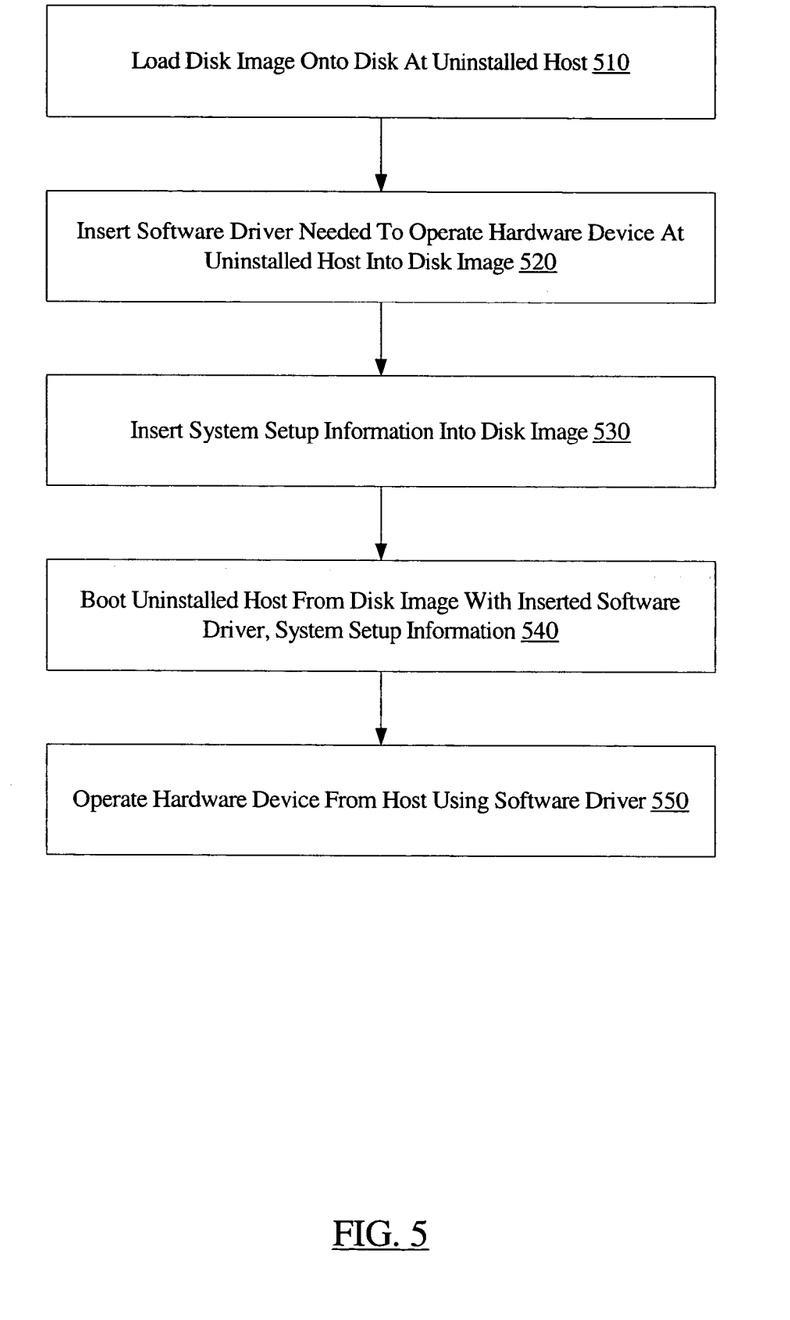
FIG. 5 is a flow diagram illustrating aspects of the operation of one embodiment, where a disk image is loaded at a disk of a target uninstalled host prior to an insertion of a software driver into the disk image.

As noted previously, one of the steps included in image-based provisioning is a loading of a disk image 120 at the uninstalled host 110 (i.e., a copying of disk image 120 to a disk intended to be the system disk for the host 110). The insertion of a software driver 130 into disk image 120 may be performed after loading the disk image at the target uninstalled host 110 in some embodiments, and before loading the disk image at the target uninstalled host 110 in other embodiments. FIG. 5 is a flow diagram illustrating aspects of the operation one embodiment of system 100, where disk image 120 is loaded at a disk of the target uninstalled host (block 510) prior to an insertion of the software driver 130 into the disk image (block 520). As noted earlier, image metadata 205 or 205M may be omitted when loading a disk image 120 to a disk at uninstalled host 110.

In order to interact with provisioning tool 180 prior to the boot of the desired operating system 210 (i.e., to allow provisioning tool 180 to load the disk image 120 and the additional software driver or drivers 130), in some embodiments the target host 110 may be configured to temporarily utilize a specialized, self-contained, memory-resident operating system other than the desired operating system 210. For example, in one implementation the uninstalled host 110 may be configured to use a network boot protocol (e.g., BOOTP) to establish communication with a boot server (which may be incorporated within provisioning server 430 in some embodiments), and to use a file transfer protocol such as TFTP (Trivial File Transfer Protocol) to obtain the specialized memory-resident operating system. The specialized memory-resident operating system may allow host 110 to interact with provisioning tool 180, e.g., to load the desired disk image 120 and to subsequently insert the needed software drivers 130 as illustrated in FIG. 5. In addition to the software driver 130, provisioning tool 180 may also insert system setup information 260 into the disk image after the disk image 120 is loaded at the target uninstalled host (block 530). The uninstalled host 110 may then be configured to boot from the modified disk image 120 (block 540), allowing access to the hardware device during normal operation using the inserted software driver (block 550).

Figure 6:
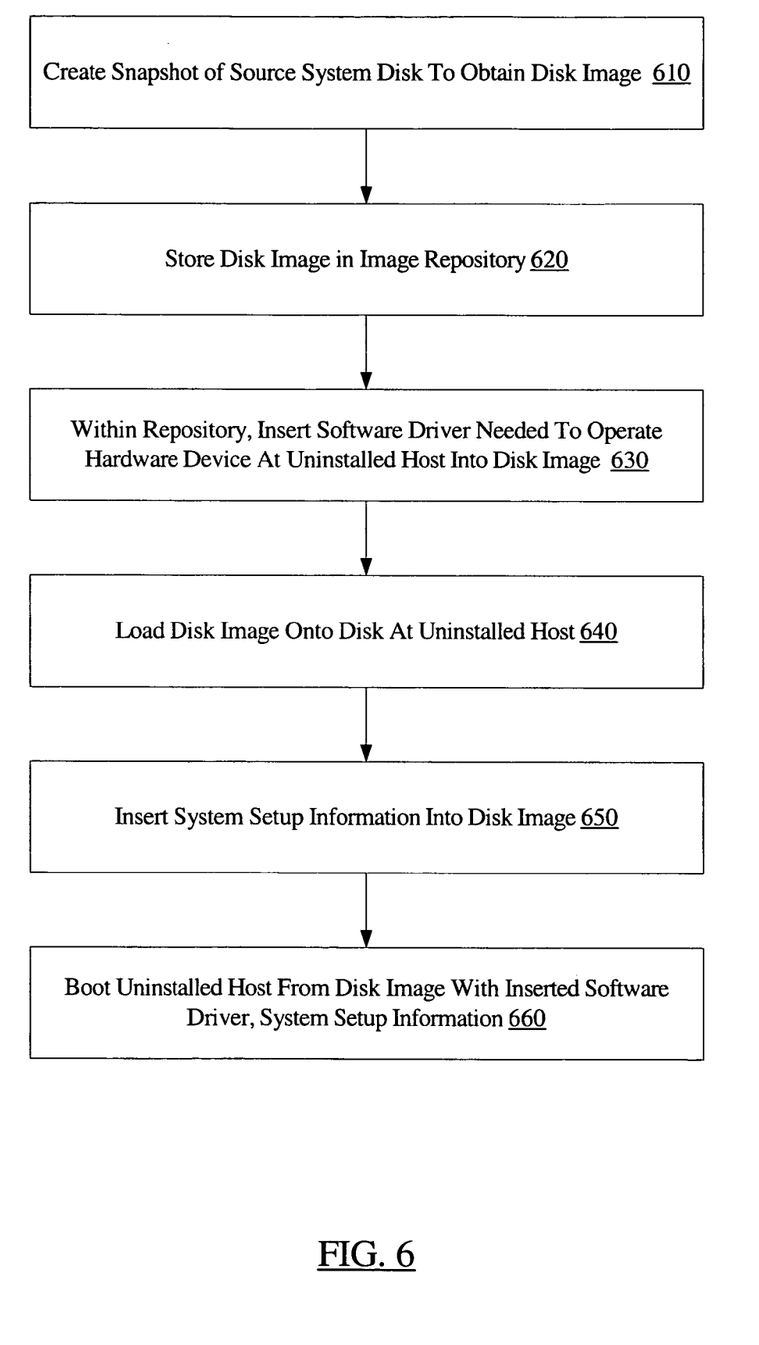
FIG. 6 is a flow diagram illustrating aspects of the operation of an embodiment, where an insertion of a software driver occurs prior to a loading of a disk image at an uninstalled host.

FIG. 6 is a flow diagram illustrating aspects of the operation of an embodiment of system 100 where an insertion of a software driver 130 occurs prior to a loading of the disk image 120 at an uninstalled host 110. As shown, in the illustrated embodiment a snapshot of a system disk 420 may be created to form a disk image 120 (block 610), and the disk image may be stored within an image repository 470 (block 620). While the disk image 120 remains within the repository, i.e., prior to loading the disk image at the uninstalled host 110, provisioning tool 180 may be configured to insert software driver 130 into the disk image (block 630). The modified disk image may then be loaded at the target uninstalled host 110 (block 640). System setup information may then be inserted into the loaded disk image by provisioning tool 180 (block 650), and the host 110 may then be booted using the modified disk image and the system setup information (block 660). The technique of inserting the software driver or drivers 130 into the disk image 120 within image repository 470 may be particularly useful when a large number of new hosts with identical hardware configurations may need to be configured. In such a situation, a one-time modification of a repository version of a disk image 120 may be more efficient than repeated modifications of disk images after they have been loaded at the target hosts.

In one embodiment, the provisioning tool 180 may also be configured to insert the system setup information while the disk image 120 is being transferred to uninstalled host 110 from repository 470, i.e., system setup information may be added "on the fly" instead of being persistently stored within disk image 120 prior to loading the host 110. In some embodiments, system setup information may be inserted, or existing system setup information may be overwritten, within the disk image 120 at the repository, prior to loading the disk image at the host.

Prior to an insertion of a needed software driver 130 into a pre-existing disk image 120, the absence of the needed software driver may first need to be detected. That is, a determination may have to be made that an additional software driver is needed, beyond the drivers already existing in the disk image 120 (e.g., in the original set of software drivers 215 of FIG. 2). A number of different approaches may be used in making such a determination. In many cases where a software driver 130 is needed for a hardware device shipped with a host 110, the host vendor (e.g., Dell Inc. or the International Business Machines (IBM) Corporation) may ship the software driver along with the host, e.g., in a compact disc. A user or administrator may then provide the software driver 130 to the provisioning tool 180.

Figure 7:
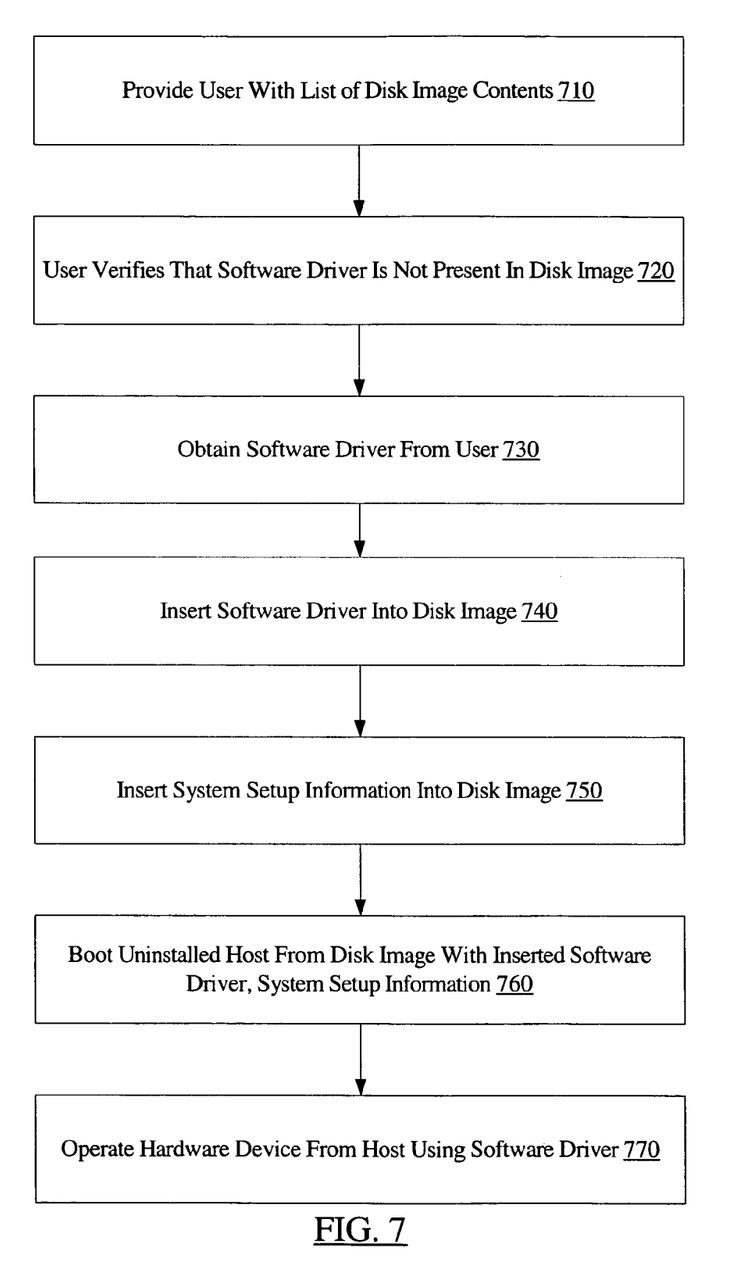
FIG. 7 is a flow diagram illustrating one embodiment where a provisioning tool may be configured to obtain a software driver from a user.

FIG. 7 is a flow diagram illustrating one embodiment where provisioning tool 180 may be configured to obtain software driver 130 from a user. As shown in block 710, provisioning tool 180 may be configured to provide a user with a listing of contents of disk image 120. The user may then check whether the needed software driver 130 is already included within the disk image 120 (block 720). If the software driver 130 is not included in the disk image 120, the provisioning tool 180 may obtain the software driver 130 from the user (block 730), for example by accessing a vendor-supplied CD provided by the user. In some embodiments, the user may have to provide the software driver 130 to provisioning tool 180 in a specific format, such as an operating-system specific package format. In such embodiments, the user may have to create the package using an operating system provided tool (such as "pkgadd" in some Unix-based operating systems). After the software driver 130 is obtained from the user, provisioning tool 180 may be configured to insert the software driver 130 into the disk image 120 (block 740).

System setup information 260 may then be inserted into the disk image 120 (block 750). In some embodiments, a parameter file containing system setup information may be created in advance for each host that is to be provisioned using the disk image 120. For example, in an environment where 20 hosts are to be configured, twenty parameter files such as "host01.setup", "host02.setup", . . . "host20.setup" may be generated, each containing the specific setup information for a particular host. In one implementation, host01.setup may include the following lines:

hostname=host01

IPaddr=AA.BB.CC.101 domain=DEV_DOMAIN timezone=GMT groups=SwDev,SwMgrs users=user01 (group=SwDev), user02(group=SwDev), mgr01(group=SwMgrs)

adminPassword=w1zzrd!01

In the example illustrated above, the contents of host01.setup may specify the host's name ("host01"), an IP address ("AA.BB.CC.101"), a network domain ("DEV_DOMAIN"), a time zone identifier "GMT"), a list of groups ("SwDev", "SwMgrs"), a list of users ("user01", "user02", "mgr01") with group memberships indicated (e.g., user01 belongs to the SwDev group), and an administrator password ("w1zzrd!01"). The contents of host02.setup may have a similar format, but may differ in the values provided for each entry—e.g., hostname may be set to "host02", the IP address to "AA.BB.CC.102", etc. The parameter files may be set up manually (i.e., by an administrator) in some embodiments, while in other embodiments one or more scripting tools, e.g., a tool written using Perl or a shell script such as Kom Shell (ksh) may be used to generate the parameter files. The specific information included within system setup information 260, and the format in which it is specified, may vary from one embodiment to another; for example, not all the entries illustrated in the exemplary parameter file described above may be included in some embodiments. After the system setup information 260 has been inserted into disk image 120, the host 110 may be booted (block 760) from the modified disk image, and the hardware device may be operated using the inserted software driver (block 770).

Figure 8:
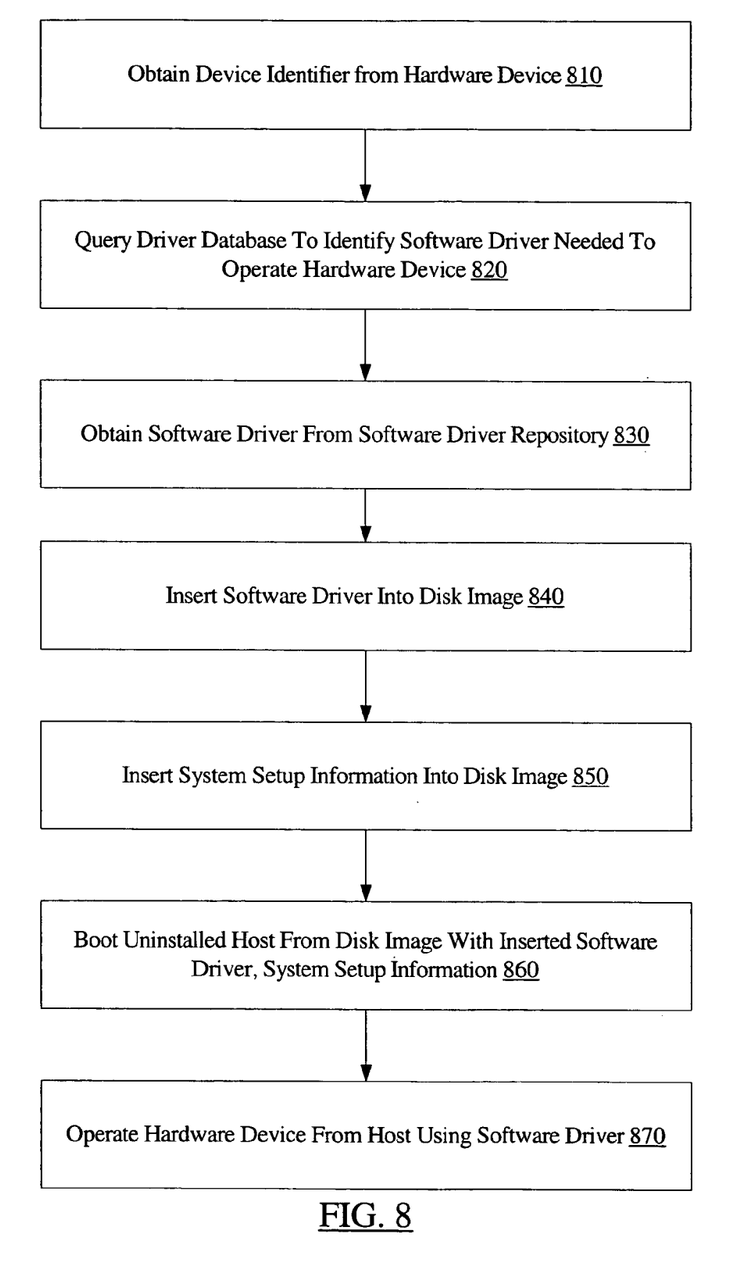
FIG. 8 is a flow diagram illustrating one embodiment where a provisioning tool may be configured to utilize a device identifier and a driver database to determine whether an additional software driver is required to operate a hardware device.

In one embodiment, the process of determining whether an additional software driver 130 is needed may be partly or fully automated, in contrast to the process including user participation illustrated in FIG. 7. FIG. 8 is a flow diagram illustrating one embodiment where provisioning tool 180 may be configured to utilize a device identifier and a driver database 440 (shown in FIG. 4) to determine whether an additional software driver 130 is required to operate the hardware device. Many modern hardware devices 140 are configured to provide a unique device identifier, such as a "Plug and Play" identifier or PnP ID in the case of hardware devices conforming to the Microsoft Windows™ Plug and Play architecture, upon being powered up, to allow an operating system or device driver to detect and adapt to hardware configuration changes. In one embodiment, a driver database 440 may provide a mapping between hardware device identifiers (such as PnP Ids) and the corresponding software drivers 130 that may be required to operate the hardware devices may be maintained. In some embodiments, driver database 440 may be maintained within a provisioning server 430, as shown in FIG. 4, while in other embodiments driver database 440 may be maintained in an external device or a host other than provisioning server 430.

As shown in block 810 of FIG. 8, provisioning tool 180 may be configured to obtain a hardware device identifier from a hardware device 140. In some embodiments, for example, provisioning tool 180 may be configured to obtain a hardware device identifier from each hardware device 140 while host 110 is booted using the specialized memory-resident operating system described earlier. Using the identifier or identifiers, provisioning tool 180 may query the driver database 440 to identify the software driver 130 that may be needed to operate a given hardware device (block 820). As shown in FIG. 4, a software driver repository 480 may be maintained within system 100 in some embodiments. The software driver repository 480 may include one or more storage devices (such as disks, tapes and/or optical storage media) containing a collection of software drivers, e.g., software drivers 130A-130M, which may have been obtained from a variety of sources such as hardware vendor web sites, installation CDs, and the like. If provisioning tool 180 detects that a particular software driver 130 that is not present within disk image 120 is needed to operate a hardware device 140, provisioning tool 180 may select or obtain the particular software driver 130 from the software driver repository 480 (block 830) without requiring user interaction. Provisioning tool 180 may then insert the selected software driver into the disk image (block 840) and perform the remaining steps described previously to bring up the host 110, such as inserting system setup information (block 850), booting the host from the modified disk image (block 860), and accessing the hardware device using the inserted software driver (block 870). It is noted that in some embodiments, provisioning tool 180 may be configured to detect the absence of a needed software driver 130 in the automated manner described above, but may still be configured to prompt a user for the software driver; that is, a combination of automation and manual interaction may be utilized.

In some embodiments, in addition to inserting a software driver and system setup information, provisioning tool 180 may also be configured to further customize a disk image 120 for use at an uninstalled host 110. For example, some operating systems 210 may include more than one version of an operating system kernel, such as a uniprocessor version of the kernel and a multiprocessor version of the kernel. The multiprocessor version of the kernel may, for example, include one or more features such as advanced multithreading support that may not be included within the uniprocessor version of the kernel. In general, during boot, a selection of the appropriate kernel version (i.e., uniprocessor or multiprocessor) may be made based on a configuration parameter value setting (e.g., a setting included within boot settings 221 or 221M shown in FIG. 2). If a disk image 120 obtained from a uniprocessor master host 410 is booted at a target host 110 without modifying the configuration parameter value, the uniprocessor version of the kernel may typically be executed, even if the target host has more than one processor available. Similarly, if a disk image obtained from a multiprocessor master host 410 is booted at a target host 110 without modifying the configuration parameter value, the multiprocessor version of the kernel may be invoked, even if the target host 110 contains only a single processor.

Figure 9:
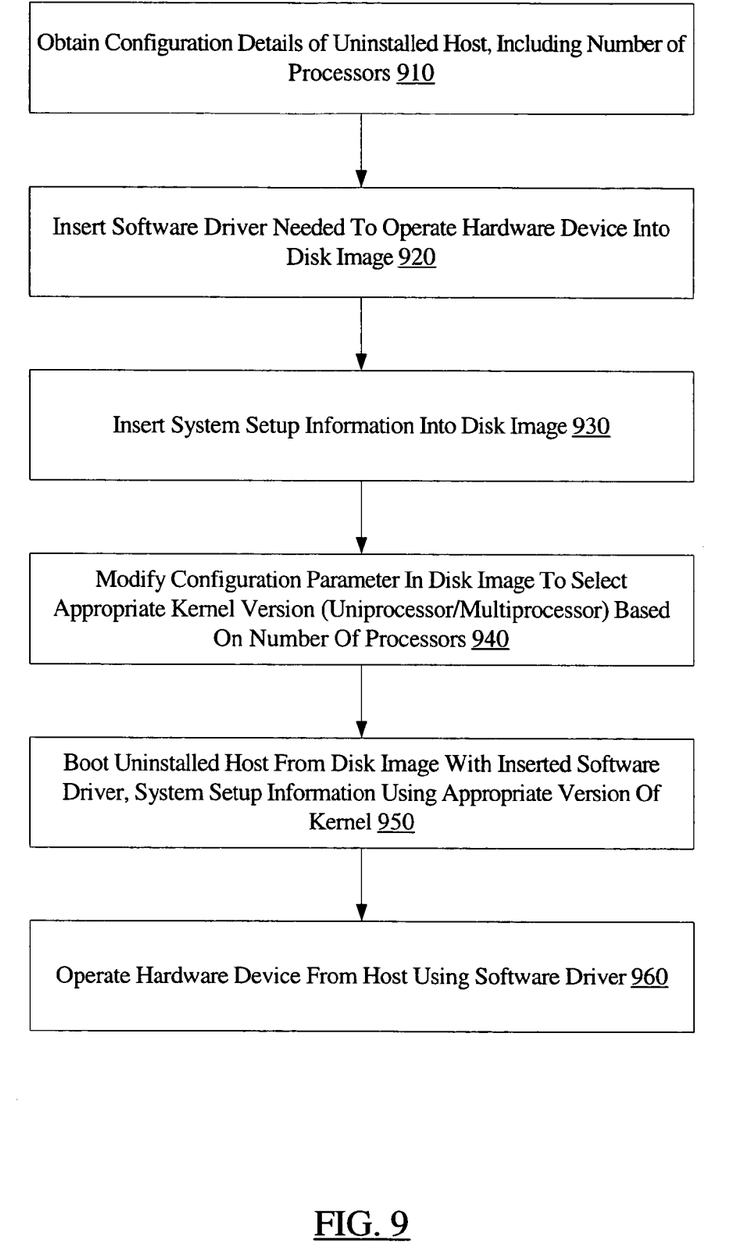
FIG. 9 is a flow diagram illustrating one embodiment where a provisioning tool may be configured to select a kernel version based on the number of processors available at an uninstalled host.

FIG. 9 is a flow diagram illustrating one embodiment where provisioning tool 180 may be configured to select a kernel version based on the number of processors available at an uninstalled host 110. As shown in block 910, provisioning tool 180 may be configured to obtain various configuration details of the uninstalled host, including the number of processors available. In addition to inserting one or more software drivers 130 and system setup information 260 into a disk image 120 (blocks 920, 930), provisioning tool 180 may also be configured to modify one or more configuration parameters (e.g., parameters included in boot settings 221) in the disk image (block 940) so that the appropriate version of the kernel is selected for the next boot operation. That is, if the target host 110 contains multiple processors, a multiprocessor version of the operating system kernel may be selected, and if the target host 110 instead has a single processor, a single processor version of the kernel may be selected. The appropriate version of the kernel may then be booted off the modified disk image (block 950), and the hardware device accessed using the inserted software driver (block 960).

In some embodiments, an operating system 210 may allow a specification of the specific number of processors to be brought online during a boot operation on a multiprocessor host 110. For example, if a multiprocessor host contains four processors, a boot configuration parameter may be used to indicate whether one, two, three, or all four of the processors are to be brought online during boot. In such an embodiment, provisioning tool 180 may also be configured to modify such a boot configuration parameter in the disk image 120 prior to booting the uninstalled host 110, i.e., to select a specific number of processors to be brought up during boot. Provisioning tool 180 may be configured to select the number of processors to be brought online at a given host 110 based on user-supplied input, e.g., via a configuration parameter file such as the "host01.setup" file described above, or based on a data center policy or corporate policy (e.g., a policy specifying that all available processors should be brought online).

It is noted that in some embodiments, provisioning tool 180 may support multiple operating systems. For example, a single provisioning tool may be capable of interacting with hosts employing various versions of Microsoft Windows™, Sun's Solaris™, Linux, IBM's AIX, etc. While the functionality provided by provisioning tool 180 has included both an insertion of a needed software driver 130 and an insertion of system setup information 260 into disk image 120, it is also noted that in some embodiments, provisioning tool 180 may be configured to insert either the software driver 130 or the system setup information 260, but not both.

In general, provisioning tool 180 may comprise any software and/or hardware components capable of providing the provisioning functionality described above. As described previously, in some embodiments, provisioning tool 180 may comprise one or more software modules incorporated within a provisioning server 430. In another embodiment, provisioning tool 180 may be a specialized hardware device, or an embedded system configured to use application specific integrated circuit (ASIC) or field-programmable gate array (FPGA) technology to provide provisioning functionality. In some embodiments, the functionality of provisioning tool 180 may be provided by a distributed collection of cooperating devices or hosts, e.g., provisioning tool 180 may consist of a plurality of software modules, with each module executing on a respective provisioning server 430. Numerous other configurations of provisioning tool 180 are possible and contemplated.

Master hosts 410, uninstalled hosts 110 and provisioning servers 430 may each comprise one or more processors, one or more memories, local non-volatile storage such as disk, and one or more network cards, as well as other devices such as a mouse, a keyboard etc. Image repository 470 and software driver repository 480 may each include any desired form of storage device, such as disks, disk array devices, optical storage devices, etc. In some embodiments, the image repository 470 and/or software driver repository 480 may include storage devices attached directly to provisioning server 430, while in other embodiments, image repository 470 and/or software driver repository 480 may be external to provisioning server 430. Disk images 120 and software drivers 130 may be stored in compressed format in their respective repository. Any desired interconnection technology and/or protocol may be used to implement network 170, such as Ethernet, Token Ring, wireless connections, fiber channel, etc. In some embodiments, one or more storage device within image repository 470 and/or software driver repository 480 may be accessible via a storage are network (i.e., network 170 may include a storage area network).

Figure 10:
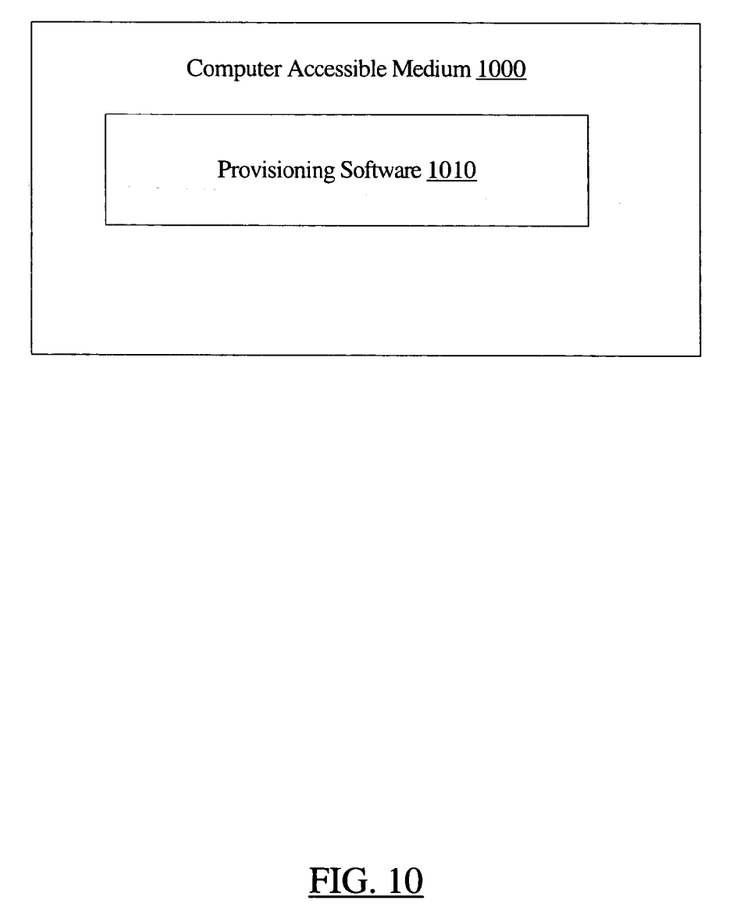
FIG. 10 is a block diagram illustrating one embodiment of a computer-accessible medium.

FIG. 10 is a block diagram illustrating a computer-accessible medium 1000 comprising provisioning software 1010 capable of providing the functionality of provisioning tool 180, image repository 470, software deriver repository 480, and driver database 440 described above. Provisioning software 1010 may be provided to a computer system using a variety of computer-accessible media including electronic media (e.g., flash memory), magnetic media such as RAM (e.g., SDRAM, RDRAM, SRAM, etc.), optical storage media such as CD-ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   an image repository which stores a disk image;
   one or more processors; and
   a memory subsystem coupled to the one or more processors, wherein the memory subsystem stores program instructions, wherein the program instructions are executable by the one or more processors to:
      receive a device identifier obtained from a hardware device; and
      insert a software driver corresponding to the received device identifier into the disk image stored in the image repository to produce a modified disk image, wherein the modified disk image is stored in the image repository;
   wherein the modified disk image stored in the image repository is operable to be installed on an uninstalled host to produce an installed host that is configured to boot using the modified disk image and to communicate with the hardware device.

2. The system of claim 1,
   wherein the modified disk image stored in the image repository is operable to be installed on a plurality of uninstalled hosts to produce a plurality of installed hosts.

3. The system as recited in claim 1, wherein the program instructions are further executable to insert system setup information in the disk image stored in the image repository prior to the boot of the uninstalled host.

4. The system as recited in claim 3, wherein the system setup information includes at least one of: a host name, a unique host identifier, an operating system product identifier, an Internet Protocol (IP) address, a network domain name, a time zone identification, an administrator password, a user name, a group name, a company name, a license code, and a regional setting.

5. The system as recited in claim 1, further comprising a software driver repository and a driver database, wherein the driver database includes a mapping from the device identifier to the software driver, and wherein the program instructions are further executable to:
query the driver database using the device identifier to obtain an identification of the software driver; and
select the software driver from the software driver repository using the identification prior to an insertion of the software driver into the disk image.

6. The system as recited in claim 1, wherein the device identifier is a Plug-and-Play Identifier (PnP ID).

7. The system as recited in claim 1, wherein the program instructions are further executable to provide a user with a listing of contents of the disk image.

8. The system as recited in claim 1, wherein the uninstalled host includes one or more processors, wherein the disk image includes a set of versions of an operating system kernel including a uniprocessor version and a multiprocessor version, wherein the program instructions are further executable to:
receive a device identifier from the uninstalled host;
detect a number of processors available at the uninstalled host; and
modify the disk image to select an appropriate version of the operating system kernel from the set of versions, corresponding to the number of processors available, for the boot of the uninstalled host.

9. The system as recited in claim 1, wherein the program instructions implementing the provisioning tool are further executable to create the disk image as a snapshot of a system disk from a master host.

10. The system as recited in claim 1, wherein the disk image includes an operating system and one or more applications.

11. The system as recited in claim 1, further comprising a network interface, wherein the device identifier is received via the network interface.

12. The system as recited in claim 1, wherein the hardware device is a network interface card (NIC).

13. A method comprising:
storing a disk image in an image repository;
receiving a device identifier obtained from a specific hardware device;
determining a software driver based on the device identifier, wherein the software driver is operable to provide access to the specific hardware device;
inserting the software driver into the disk image stored in the image repository to produce a modified disk image, wherein the modified disk image is stored in the image repository;
wherein the modified disk image is installable on an uninstalled host to produce an installed host, wherein the installed host is configured to boot using the modified disk image and to communicate with the hardware device.

14. The method of claim 13,
wherein the modified disk image stored in the image repository is operable to be installed on a plurality of uninstalled hosts to produce a plurality of installed hosts.

15. The method as recited in claim 13, further comprising:
inserting system setup information in the disk image stored in the image repository prior to the boot of the uninstalled host.

16. The method as recited in claim 15, wherein the system setup information includes at least one of: a host name, a unique host identifier, an operating system product identifier, an Internet Protocol (IP) address, a network domain name, a time zone identification, an administrator password, a user name, a group name, a company name, a license code, and a regional setting.

17. The method as recited in claim 13, wherein the specific hardware device is a disk device.

18. The method as recited in claim 13, wherein the specific hardware device is a network interface card (NIC).

19. The method as recited in claim 13, further comprising:
creating the disk image as a snapshot of a system disk from a source host prior to storing the disk image in the image repository.

20. The method as recited in claim 13, further comprising:
deploying the modified disk image from the image repository to the uninstalled host to produce the installed host.

21. The method as recited in claim 20, further comprising:
booting the installed host using the modified disk image.

22. A computer accessible memory medium comprising program instructions, wherein the instructions are executable to:
store a disk image in an image repository;
receive a device identifier obtained from a specific hardware device; and
insert a software driver into the disk image stored in the image repository to produce a modified disk image, wherein the modified disk image is stored in the image repository, wherein the software driver is operable to provide access to the specific hardware device;
wherein the modified disk image is installable on each of a plurality of uninstalled hosts to produce a respective plurality of installed hosts, wherein each of the installed hosts is configured to boot using the modified disk image and to communicate with the hardware device.

23. The computer accessible memory medium as recited in claim 22, wherein the instructions are further executable to:
insert system setup information in the disk image prior to booting the uninstalled host.

24. The computer accessible memory medium as recited in claim 22, wherein the instructions are further executable to:
load the disk image to a disk device at the uninstalled host after inserting the software driver and prior to a boot of the uninstalled host.

25. The computer accessible memory medium as recited in claim 22, wherein the program instructions are executable to:
deploy the modified disk image from the image repository to the uninstalled host to produce the installed host.

26. The computer accessible memory medium as recited in claim 25, wherein the program instructions are executable to:
boot the installed host using the modified disk image after the modified disk image is deployed to the uninstalled host.

* * * * *